Nov. 10, 1970 — D. T. LOKERSON — 3,539,809
NUCLEAR RADIATION DOSIMETER USING A STEP RECOVERY DIODE
Filed Dec. 20, 1967
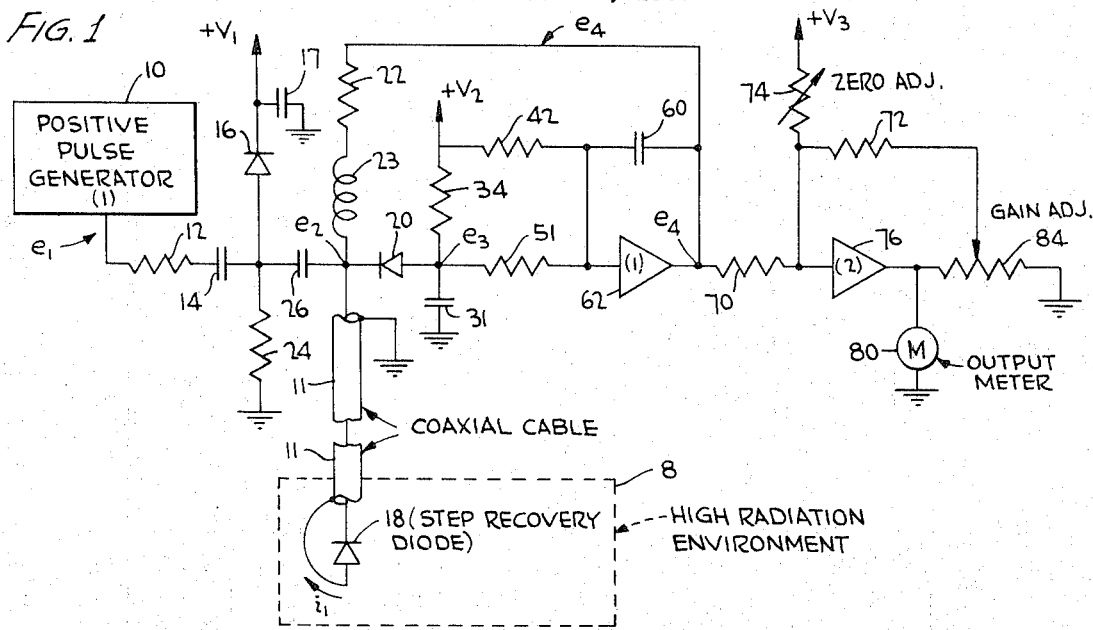
FIG. 1
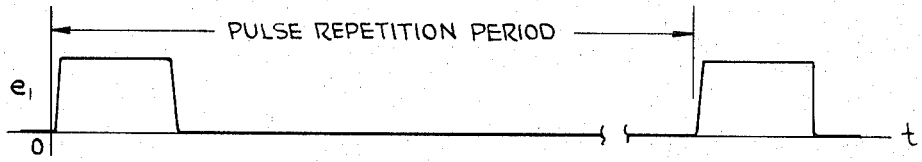
FIG. 2a
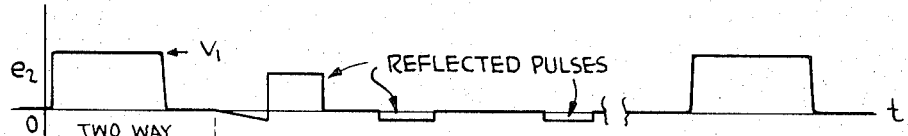
FIG. 2b
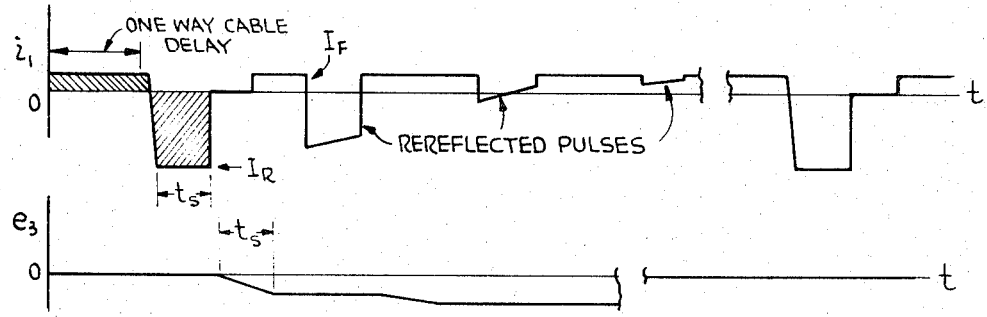
FIG. 2c
FIG. 2d
INVENTOR,
DAVID T. LOKERSON
BY Harry M. Saragovitz
Edward J. Kelly, Herbert Berl
& Gerald L. Litt
ATTORNEYS

United States Patent Office 3,539,809
Patented Nov. 10, 1970

---

3,539,809
NUCLEAR RADIATION DOSIMETER USING A STEP RECOVERY DIODE
David T. Lokerson, Rockville, Md., assignor to the United States of America as represented by the Secretary of the Army
Filed Dec. 20, 1967, Ser. No. 692,028
Int. Cl. G01t 1/16
U.S. Cl. 250—83.3            6 Claims

ABSTRACT OF THE DISCLOSURE

A system for determining the cumulative nuclear radiation impinging on a monitored region using a step-recovery diode as a transducer. The step-recovery diode is subjected to the radiation to be cumulatively measured. By measuring the change in parameters of the diode to determine what change the radiation has had on its minority carrier lifetime, the cumulative radiation fluence that the diode has been subjected to can be determined.

---

The invention described herein may be manufactured, used, and licensed by or for the Government for governmental purposes without payment to me of any royalty thereon.

BACKGROUND OF THE INVENTION

This invention relates to a means of measuring the cumulative fluence, or total nuclear radiation, that impinges on an area over a period of time. Previously such measurements were made using standard dosimeter instruments that are well known in the art, the most common of these instruments being the film badge and the ionization chamber. In the former, the degree of blackening on the photographic film is a measure of the radiation absorbed by the film. In the latter, the amount of charge lost by an initially charged electrometer is a measure of the ionization produced in the chamber due to the radiation fluence.

The film badge can be used to measure the radiation to which personnel have been exposed, but it is not suitable for measuring the cumulative radiation in remote locations. While the ionization chamber can be used for this purpose, it has the disadvantages of being bulky, expensive, and susceptible to error from outside influences.

Until my invention there has been no system that would allow a simple, accurate real time measurement of nuclear radiation fluence at remote locations. Additionally, no dosimeter system has been flexible in its adaptability to different types of instrumentation situations.

It is therefore an object of the invention to provide a means of measuring the total nuclear radiation impinging on an area over a period of time.

An additional object of the invention is to provide a means of measuring cumulative nuclear radiation fluence at remote locations.

Another object of the invention is to provide a means of measuring cumulative nuclear radiation fluence which is adaptable to a wide range of instrumentation situations.

Still another object of the invention is to provide a means of measuring cumulative nuclear radiation fluence that is inexpensive and accurate.

Still another object of the invention is to provide a means of measuring cumulative nuclear radiation fluence utilizing the effect that radiation has on a semiconductor element.

Still another object of the invention is to provide a method of measuring the total nuclear radiation impinging on an area over a period of time.

Still another object of the invention is to provide a method of measuring cumulative nuclear radiation fluence by utilizing the effect that radiation has on a step-recovery diode.

SUMMARY OF THE INVENTION

My invention is a dosimeter system using a step-recovery diode as a transducer to measure cumulative nuclear radiation fluence. It has been found that of all the step-recovery diode parameters, only the minority carrier lifetime (which is fundamental parameter that determines the storage time) is measurably affected by exposure of the diode to radiation. By determining the carrier lifetime before and after irradiation, the radiation fluence that the diode has been exposed to during radiation may be determined.

My invention uses a single-measurement system which determines a diode's storage time. Since the storage time is known, the carrier lifetime can be determined. With this invention it is now possible to measure cumulative radiation fluence is a remotely located measuring situation by simply monitoring the carrier lifetime of the step recovery diode located within the monitored region. The invention may also be used in a more conventional manner. The semiconductor can be carried by an individual working within radiation sensitive environment. Periodically the semiconductor could be inserted into a socket connected to a circuit which measures the cumulative radiation to which the semiconductor and hence the person has been subjected. Such a system is as simple as carrying a photographic film dosimeter and has the advantage of allowing a more accurate measurement of the cumulative radiation to which the individual has been subjected.

BRIEF DESCRIPTION OF THE DRAWING

The specific nature of the invention, as well as other objects, aspects, uses and advantages thereof, will clearly appear from the following description and from the accompanying drawing, in which:

FIG. 1 is a schematic diagram of a remote reading nuclear radiation fluence meter in accordance with the present invention.

FIG. 2a is a waveform of the voltage from the input pulse generator in the circuit of FIG. 1.

FIG. 2b is a waveform illustrating the voltage at the input end of the coaxial cable in FIG. 1.

FIG. 2c is a waveform showing the current through the step-recovery diode in the circuit of FIG. 1.

FIG. 2d is a waveform of the voltage at another point in the circuit of FIG. 1.

DESCRIPTION OF A TYPICAL EMBODIMENT

FIG. 1 shows the relatively simple circuitry used to determine by analog techniques the simple functional relationship that exists between a step-recovery diode's minority carrier lifetime and the radiation fluence that has impinged thereon. This relationship will hold whether the radiation is applied in a single pulse or in multiple pulses. The circuit is designed to calculate and display the level of fluence on a meter.

The remote reading fluence meter of FIG. 1 uses a step-recovery diode 18 for the fluence to analog voltage transducer. A positive pulse generator 10 applies a pulse through resistor 12, capacitor 14 and capacitor 26 to the coaxial cable 11. A diode 16 is connected to the junctions of capacitors 14 and 26 and to a positive voltage source $V_1$. Capacitor 17 connects the cathode of diode 16 to ground and resistor 24 connects the junction of the capacitors 14 and 26 to ground. The step-recovery diode 18 is connected to the end of coaxial cable 11 with its polarity as shown. The diode can be placed within a high radiation environment designated by dotted line 8.

The coaxial cable 11 is connected to the junction of capacitor 26, inductance 23 and the cathode of diode 20. The anode of diode 20 is in turn connected to one end of capacitor 31 which has its other end grounded. Resistor 34 with its other end connected to source $V_2$ and resistor 51 connected at its other end to operational amplifier 62 are also connected to the same side of the capacitor 31. Resistor 42 is in parallel with resistors 34 and 51 and capacitor 60 is in parallel with the operational amplifier 62. A resistor 22 connects the output of the operational amplifier 62 to the other end of inductor 23.

The output of the operational amplifier 62 is connected through resistor 70 to a second operational amplifier 76. Meter 80 is connected to the output of amplifier 76 as is a potentiometer 84 which is connected in parallel with the meter 80 and used to adjust the gain of the amplifier. Resistor 72 is connected to the variable arm of the potentiometer 84 and is in parallel with the amplifier 76. For purposes of zero adjustment, resistor 74 connects the input of the amplifier to a source $V_3$.

The positive pulse generator 10 supplies pulses with a repetition rate that is low enough so that the reflected pulses in the coaxial cable 11 will have been attenuated to an insignificant amplitude before the next pulses are applied while still having a repetition rate high enough to insure stable operation of the circuit. The waveform of the output from the pulse generator 10 is shown in FIG. 2a.

When the pulse height from the positive pulse generator 10 exceeds the voltage $V_1$, diode 16 will conduct through capacitor 17 to clamp the pulse height to that amplitude. Inductance 23 and reverse-biased diode 20 both present high impedances to a positive pulse approaching the coaxial cable 11. This pulse therefore travels down the coaxial cable 11 towards the step-recovery diode 18. Prior to the arrival of the pulse, a voltage $e_4$ will cause current to flow through resistor 22 and inductance 23 so as to forward bias the diode 18 and cause a forward current $I_f$ in the diode 18. This current results in a charge Q being stored on the junction of the diode 18. When the positive pulse approaches the diode 18 along the cable 11, the pulse must first remove this charge before the diode can switch from a very low to a very high impedance. During the period required for the charge to be removed, a reverse current $I_r$ flows in the diode 18. The time required for this stored charge to be removed, $t_s$ is:

$$t_s = \left| \frac{I_f}{I_r} \right| \tau = \left| \frac{-e_4/R_{22}}{2\frac{V_1}{Z_0} + \frac{e_4}{R_{22}}} \right| \tau = \left| \frac{+\tau}{\frac{2R_{22}}{Z_0}\frac{V_1}{e_4} + 1} \right| \quad (1)$$

where:

$t_s$ is the storage time,
$I_f$ is the forward bias current,
$I_r$ is the reverse diode current,
$\tau$ is the minority carrier lifetime,
$V_1$ is the pulse height, and
$Z_0$ is the characteristic impedance of the coaxial cable.

During the period that the step-recovery diode 18 is in its low impedance state, the positive pulse coming down the cable 11 will see a short circuit and be reflected back up the cable as a negative pulse. After the diode 18 switches to its high impedance state the reflected pulse will maintain its positive value since the cable will effectively be terminated in an open circuit. Thus, the pulse reflected from the diode termination of the cable will be negative for a period of $t_s$ after which it will revert to a positive value.

When the reflected negative pulse returns to the upper end of the coaxial cable 11, diode 20 will be biased into forward conduction and will conduct through capacitor 31. Since the value of capacitor 31 is chosen so that $Z_0 \times C31$ is much longer than the pulse width, the negative voltage developed across capacitor 31 will be nearly equal to the area under the negative portion of the pulse. This capacitive termination will also cause a re-reflection to occur. When the reflected positive pulse reaches diode 20 it becomes biased open and the cable termination for the reflected positive pulse will become the impedance of resistor 12 plus the pulse generator's internal impedance with resistance 24 in parallel. Resistance 24 should be chosen to provide a matched cable termination, which will prevent re-reflection of the positive portion of the reflected pulse.

The re-reflected negative portion of the pulse will now travel back down the cable 11 to the diode 18 and cause the diode to again be forward biased. The pulse will again be reflected by the short circuited diode 18 and it will again have a positive polarity and be absorbed in the resistive termination provided by resistors 12 and 24. Losses in the cable and in the terminations will eventually cause any residual reflections to decay in amplitude so that the charge on capacitor 31 becomes stable.

The waveforms shown in FIGS. 2b, c and d show the voltage $e_2$ at the input end of the cable termination, the current $i_1$ through the diode 18 and the voltage $e_3$ across the capacitor 31 respectively. In FIG. 2b, the voltage $e_2$ at the input of the cable 11 shows the clamped pulse applied at $t=0$ and the reflected pulse from the diode 18 arriving at a time equal to the time necessary for the pulse to travel down the cable and back.

The current through the diode 18 shown in FIG. 2c will reverse when the positive pulse is applied at the diode end of the cable 11. As can be seen in the waveform, this pulse will be delayed in reaching the diode 18 by the time it takes to travel down the cable to the diode. The period of time that the current in the diode is flowing in the reverse direction is the time that it takes for the stored charge in the diode 18 to return to the driving circuit. This carrier lifetime is shown in the current waveform as being denoted by $t_s$.

The waveform in FIG. 2c shows the charge in capacitor 31 which builds up when the negative pulse is returned from the diode terminated end of the cable. As the re-reflected pulses decrease in amplitude the amount of charge added to the capacitor will of course decrease similarly.

Capacitor 31 will discharge relatively slowly through the resistors 34 and 51. The current flowing through resistors 42 and 51 will cause the operational amplifier 62 and capacitor 60 to make the voltage $e_4$ equal to the negative integral of the net current through resistors 51 and 42. If the average current through resistor 51 were less negative than the positive current through resistor 42 (i.e. if $t_s$ were too small), then $e_4$ will become more negative. Resistor 22 will then increase the forward bias on the step recovery diode 18 and will cause the next pulse to have a larger $t_s$. Resistor 22 supplies a feedback path so that $t_s V_1$ stays at a constant value defined as $\alpha$. Then $$\alpha = t_s \quad (2)$$

By Equation 1:

$$\tau = \left| -\frac{2R_{22}V_1 t_s}{Z_0 e_4} - t_s \right| = \left| \frac{2R\alpha_{22}}{Z_0 e_4} - \frac{\alpha}{V_1} \right| = \left| -\alpha \left( \frac{2R_{22}}{Z_0 e_4} + \frac{1}{V_1} \right) \right| \quad (3)$$

If it is assumed that:

$$\frac{e_4 Z_0}{2R_{22}} \ll V_1 \quad (4)$$

which means that:

$$\frac{e_4}{2R_{22}} = \frac{I_F}{2} \ll \frac{V_1}{Z_0} \approx I_R \quad (5)$$

which by Equation 1 means that:
Then:

$$\tau \gg t_s \quad (6)$$

$$\tau \doteq \left| -2\frac{\alpha}{e_4}\frac{R_{22}}{Z_0} \right|; \text{ for } \tau \gg t_\text{S} \qquad (7)$$

Assume that $e_4$ initially equals $E_B$ then the lifetime before irradiation, $\tau_B$, is:

$$\tau_B \doteq \left| -2\frac{\alpha}{E_B}\frac{R_{22}}{Z_0} \right| \qquad (8)$$

and similarly, the lifetime after irradiation, $\tau_A$ is:

$$\tau_A \doteq \left| -2\frac{\alpha}{E_A}\frac{R_{22}}{Z_0} \right| = \frac{\tau_B E_B}{E_A} \qquad (9)$$

Define:
$$E_0 = E_A - E_B \qquad (10)$$

Then:

$$\frac{\tau_B}{\tau_A} = \frac{E_A}{E_B} = \frac{E_B + E_0}{E_B} = 1 + \frac{E_0}{E_B} \qquad (11)$$

Radiation tests of step-recovery diodes were performed by the inventor and analysis of the test data is reported in the Harry Diamond Laboratories technical report No. TR1339. The relationship between the step recovery diode carrier lifetime before and after irradiation was found to be:

$$\frac{\tau_B}{\tau_A} = 1 + \tau_B \frac{K}{C} \phi \qquad (12)$$

where:

$K/C$ is nearly constant for a particular type of diode and energy spectrum of radiation.
$\phi$ is the radiation fluence.
Equations 8, 11 and 12 can be combined to yield:

$$\frac{E_0}{E_B} \doteq \tau_B \frac{K}{C} \theta = \left| -2\frac{\alpha}{E_B}\frac{R_{22}}{Z_0}\frac{K}{C}\phi \right| \qquad (13)$$

If:
$$\tau \gg t_\text{S}$$
$$\alpha = t_\text{S} V_1$$

or:

$$E_0 \doteq \left| 2t_\text{S} V_1 \frac{R_{22}}{Z_0}\frac{K}{C}\phi \right| \text{ for } \tau \gg t_\text{S} \qquad (14)$$

where:

$E_0$ is the change in the value of $e_4$ due to the radiation fluence $\phi$.
$t_s$ is the storage time of the charge in the diode which is held constant by the circuit associated with operational amplifier 62.
$V_1$ is the applied pulse height which is held constant by diode 16.
$R_{22}$ is the value of a resistor.
$Z_0$ is the characteristic impedance of the coaxial cable (1).
$K/C$ is the sensitivity of the diode minority carrier lifetime to the energy spectrum of the radiation fluence, which is nearly constant.
$\phi$ is the radiation fluence.
$\tau$ is the minority carrier lifetime.

From Equation 14 it is apparent that if $E_0$, which is the change in value of $e_4$ due to the radiation fluence can be measured, then it is possible to determine the amount of radiation fluence to which the step recovery diode has been subjected. The operational amplifier 76 and its associated circuitry including meter 80 provide a metering system so that the meter reading will indicate only the change in $e_4$. Current flows from $e_4$ through resistor 70 and has a value equal to the voltage divided by resistance. An opposite current flows from $V_3$ through resistance 74. If these two currents are adjusted so that they are equal and opposite, then the voltage at the output of the operational amplifier 76 will be zero. This can be accomplished by setting resistance 74 so that the meter 80 reads zero before radiation is applied to the step recovery diode. Resistance 72 should have switchable values so that a large dynamic range of possible radiation levels permit the output meter to operate within its narrow dynamic range. Resistance 84 permits the gain of the operational amplifier 76 to be adjusted to provide a calibrated output meter reading for various radiation spectra (i.e. to compensate for known variations in the value of $K/C$).

When remote real-time operation is not required, a polarity reversing pulse transformer could be connected in series with the step-recovery diode 18 instead of the coaxial cable 11. The output of this transformer would have a matching resistor connected in parallel with a cathode of diode 20 in ground. This type of device could be used to measure the radiation dosage to which personnel have been exposed. This step-recovery diode would have the advantage of being small, rugged, and drift free (unlike electrostatic personnel dosimeters).

It should also be noted that while this embodiment employs an analog system, it is described only because it is in general, less expensive than other techniques, such as time interval meters or other pulse and pulse-analog methods.

One of the added benefits of this system is that it uses relatively high voltages and currents to make the measurements so that the small currents and voltages induced by radiation do not seriously affect the accuracy of the data.

It will be apparent that the embodiments shown are only exemplary and that various modifications can be made in construction and arrangement within the scope of the invention as defined in the appended claims.

I claim as my invention:

1. A metering system for determining cumulative nuclear radiation fluence comprising:
    (a) a semiconductor element which is exposed to the radiation to be measured,
    (b) means to measure the change in storage time of said element due to the radiation whereby the cumulative radiation exposure of said element may be determined.

2. The invention of claim 1 wherein the semiconductor element is a step-recovery diode.

3. The invention of claim 2 wherein the measuring means also includes means for directly indicating the cumulative nuclear radiation to which the diode has been exposed.

4. A method for measuring cumulative nuclear radiation fluence comprising the steps of:
    (a) locating a semiconductor element within the region of radiation to be measured,
    (b) monitoring the parameters of said element so as to determine the change in storage time of said element due to the radiation exposure.

5. A metering system as in claim 3 wherein said means to measure includes:
    a coaxial cable having a first end connected to said step-recovery diode,
    a pulse generator for repetitively applying pulses to said step-recovery diode through said coaxial cable,
    a network formed of a semiconductor and an inductor and connected to a second end of said coaxial cable for providing a high impedance so that said pulses from said pulse generator will approach said step-recovery diode,
    means for forward biasing said step recovery diode prior to the receipt of a pulse from said pulse generator whereby a charge is stored at the junction formed by said step-recovery diode and the first end of said coaxial cable, and wherein upon the application of a pulse from said pulse generator, said stored charge will be removed, the time of removal being indicative of said cumulative nuclear radiation.

6. A metering system as in claim 5, wherein said means for directly indicating the cumulative radiation includes:
- an operational amplifier,
- an output meter connected to said operational amplifier, and
- a variable resistor for initially adjusting said meter to a zero reading.

References Cited

UNITED STATES PATENTS

| | | | |
|---|---|---|---|
| 3,209,171 | 9/1965 | Amodei | 307—281 |
| 3,321,626 | 5/1967 | Allenden et al. | 250—83.3 |
| 3,369,131 | 2/1968 | Stromer | 307—281 |

ARCHIE R. BORCHELT, Primary Examiner

U.S. Cl. X.R.

307—281, 319